US007275874B2

(12) United States Patent
Takeda et al.

(10) Patent No.: US 7,275,874 B2
(45) Date of Patent: Oct. 2, 2007

(54) OPTICAL CONNECTOR FOR CONNECTING OPTICAL FIBERS TO ONE ANOTHER

(75) Inventors: Jun Takeda, Tokyo (JP); Akihiro Onogawa, Tokyo (JP); Yuichi Koreeda, Tokyo (JP); Masashi Maruyama, Tokyo (JP); Haruyuki Koshimizu, Tokyo (JP); Kiyoyuki Mutaguchi, Tokyo (JP); Hidehiko Matsushita, Tokyo (JP); Shin Sasaki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/913,207

(22) Filed: Aug. 6, 2004

(65) Prior Publication Data

US 2005/0031268 A1    Feb. 10, 2005

(30) Foreign Application Priority Data

Aug. 8, 2003    (JP) .............................. 2003-290756

(51) Int. Cl.
*G02B 6/36* (2006.01)

(52) U.S. Cl. .......................................... 385/71; 385/70
(58) Field of Classification Search .................. 385/54, 385/56, 58, 59, 63, 65, 66, 71
See application file for complete search history.

(56) References Cited

U.S. PATENT DOCUMENTS 4,779,950 A * 10/1988 Williams ..................... 385/58

| 5,480,344 A | 1/1996 | Xu et al. |
| 6,491,442 B1 * | 12/2002 | Murakami et al. ............ 385/58 |
| 2002/0159710 A1 * | 10/2002 | Weigel ......................... 385/58 |
| 2003/0198442 A1 * | 10/2003 | Cheng et al. ................. 385/83 |

FOREIGN PATENT DOCUMENTS

| JP | 61-113011 | 5/1986 |
| JP | 06-059159 | 3/1994 |
| JP | 08-292344 | 11/1996 |
| JP | 08 292344 | 11/1996 |
| JP | 10-300986 | 11/1998 |
| JP | 11-72644 | 3/1999 |
| JP | 2000-056161 | 2/2000 |
| JP | 2000-56161 | 2/2000 |
| JP | 2000-121861 | 4/2000 |
| JP | 2001042167 | 2/2001 |
| JP | 2003-121700 | 4/2003 |

* cited by examiner

*Primary Examiner*—Sung Pak
(74) *Attorney, Agent, or Firm*—Collard & Roe P.C.

(57) ABSTRACT

An optical connector comprises a clamp member holding an optical fiber, a first housing to which the clamp member is fixed, and a second housing fitted to the first housing. The first housing has an aligning portion for aligning and positioning the optical fiber, and a clamp holding portion holding the clamp member. The optical fiber has an end portion protruding forward from the aligning portion in a cantilevered state.

4 Claims, 5 Drawing Sheets

OPTICAL CONNECTOR FOR CONNECTING OPTICAL FIBERS TO ONE ANOTHER

This application claims priority to prior Japanese application JP 2003-290756, the disclosure of which is incorporated herein by reference.

BACKGROUND OF THE INVENTION

This invention relates to an optical connector for directly connecting optical fibers to one another.

In recent years, proposal is made of an optical connector for directly connecting a plurality of optical fibers to one another. The optical connector of the type is required to be able to mount the optical fibers with high density and to be reduced in size.

The optical connector comprises a housing and a clamp member holding the optical fibers.

Each of the optical fiber is held by the clamp member after an end of the optical fiber is preliminarily polished. Thereafter, the optical fiber is inserted through a narrow hole of the housing to be slightly protruded from the housing by a predetermined length. Simultaneously, the clamp member is adhered and fixed to the housing. For example, such optical connector is disclosed in Japanese Patent Application Publication (JP-A) Nos. 2001-42167 and 2000-56161.

However, the above-mentioned optical connector requires such a highly skilled and complicated operation of inserting the optical fiber through the narrow hole of the housing to slightly protrude the optical fiber from the housing by the predetermined length and simultaneously adhering and fixing the clamp member to the housing.

In an assembling operation of the optical connector, when the optical fiber is inserted into the narrow hole, polishing waste left after polishing or dust in the narrow hole is often attached to an end face and a side surface of the optical fiber.

Therefore, after the clamp member is adhered and fixed to the housing, the optical connector requires a troublesome work to remove the polishing waste or the dust adhered to the optical fiber.

SUMMARY OF THE INVENTION

It is an object of this invention to provide an optical connector capable of readily carrying out operations concerning an attaching of an optical fiber to the optical connector.

Other object of the present invention will become clear as the description proceeds.

According to this invention, there is provided an optical connector for connecting a plurality of optical fibers to one another at their ends, wherein the optical connector comprises a clamp member for holding the optical fibers and a first housing supporting the clamp member fixedly attached thereto, the first housing having an aligning portion for aligning and positioning the optical fibers and a clamp holding portion holding the clamp member, the optical fibers being protruded outward from the aligning portion in a cantilevered state.

DESCRIPTION OF THE PREFERRED EMBODIMENT

Figure 1:
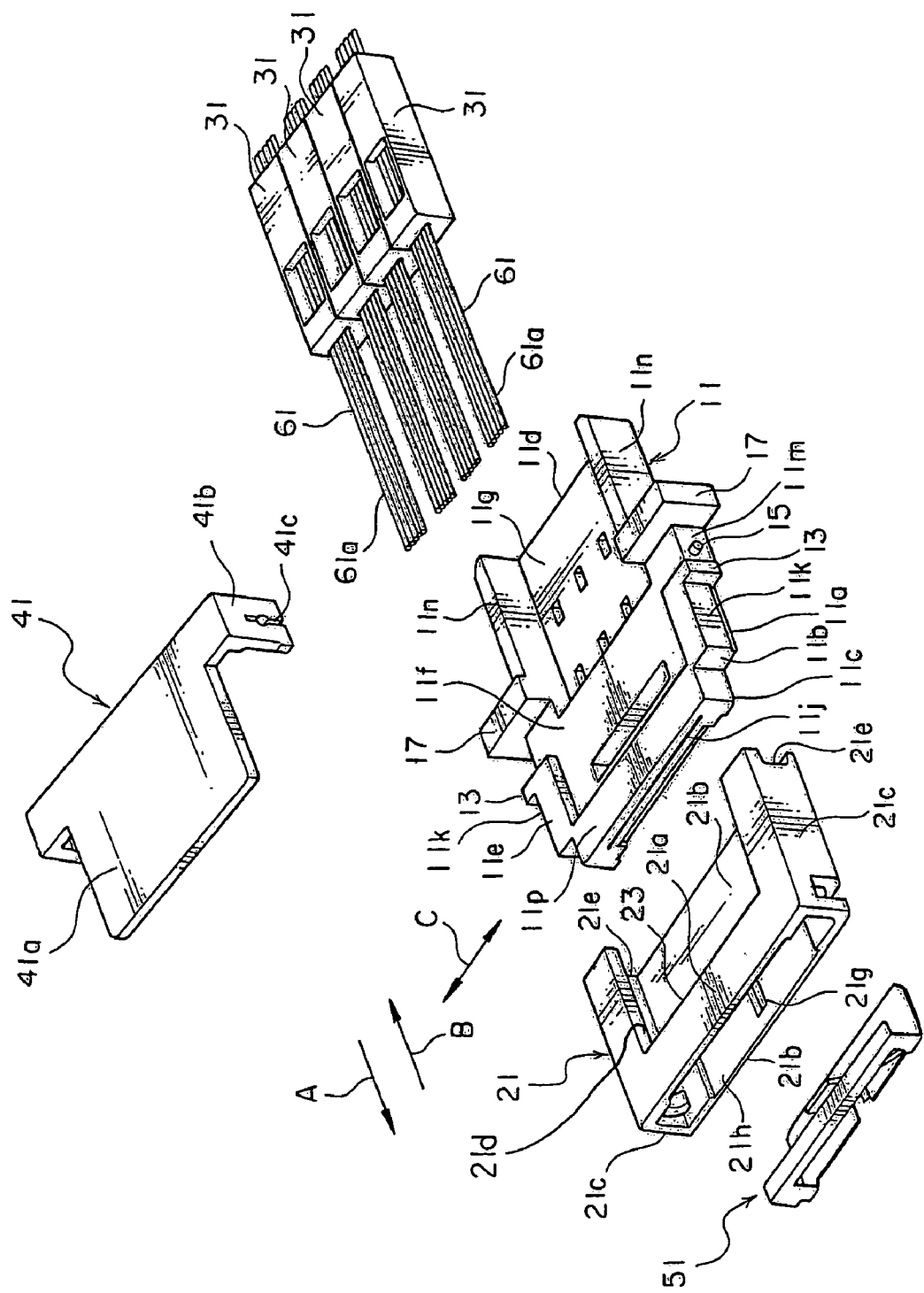
FIG. 1 is an exploded perspective view showing, together with optical fibers, an optical connector according to an embodiment of this invention.

Now, an optical connector according to one embodiment of this invention will be described with reference to the drawing.

At first referring to FIG. 1, the optical connector comprises a first housing 11, a second housing 21 fitted to the first housing 11, and a plurality of clamp members 31 mounted to the first housing 11.

The optical connector further comprises a cover member 41 attached to the first housing 11 to cover a part of the first housing 11, and a fiber protector member 51 attached to the second housing 21.

The first housing 11 has a main body portion 11a of a generally rectangular plate-like shape, an aligning portion 11c, and a clamp holding portion 11d. The main body portion 11a has a front end face 11b on a front side in a first direction A depicted by an arrow in FIG. 1.

The aligning portion 11c protrudes from the front end face 11b in the first direction A. The clamp holding portion 11d is formed on a rear side of the main body portion 11a in the first direction A, i.e., on a front side in a second direction B opposite to the first direction A.

The main body portion 11a has an upper surface 11e provided with a fiber confronting surface 11f formed near the aligning portion 11c. The fiber confronting surface 11f is located in a plane slightly lower in level than the upper surface 11e and extending in parallel to the upper surface 11e. The clamp holding portion 11d is a large groove-like portion and has a clamp holding surface 11g adjacent and contiguous to the fiber confronting surface 11f.

The clamp holding surface 11g is formed adjacent and contiguous to the fiber confronting surface 11f. The clamp holding surface 11g is located in a plane lower in level than the fiber confronting surface 11f and extending in parallel to the fiber confronting surface 11f.

Figure 2:
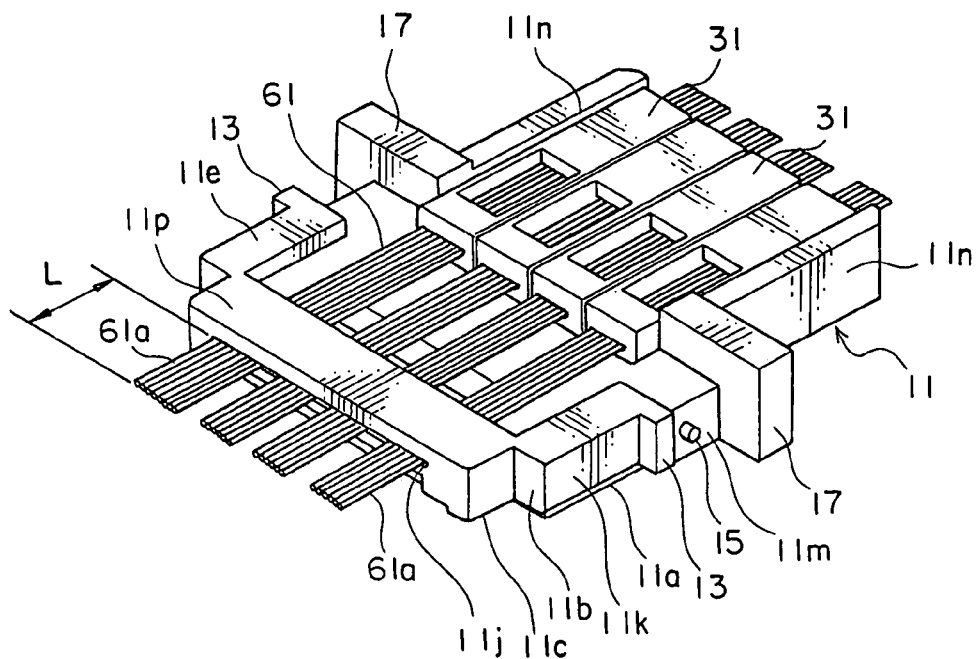
FIG. 2 is a perspective view showing, together with optical fibers, an assembly of a first housing and clamp members included in the optical connector.

Referring to FIG. 2, the optical connector illustrated in FIG. 1 is assembled. Referring to FIGS. 1 and 2, the aligning portion 11c is provided with a fiber inserting portion 11j. The fiber inserting portion 11j serves to align and position a plurality of optical fibers 61 extending over the fiber confronting surface 11f in the first and the second directions A and B.

The optical fibers 61 have end portions 61a on the front side in the first direction A. The fiber inserting portion 11j holds the optical fibers 61 with the end portions 61a protruding from a front end face of the aligning portion 11c. The fiber inserting portion 11j is provided with a plurality of grooves (not shown) formed on an inner surface thereof. Each of the grooves has a V-shaped section and extends in the first and the second directions A and B to position each individual optical fiber 61. Instead of the grooves, the fiber inserting portion 11j may be provided with a plurality of narrow holes having a circular section and extending in the first and the second directions.

The main body portion 11a has a pair of first side surfaces 11k, a pair of second side surfaces 11m adjacent to the first side surfaces 11k and extending in the second direction B, and a pair of third side surfaces 11n adjacent to the second side surfaces 11m and extending in the second direction B.

The first side surfaces 11k are faced to each other in a third direction C (FIG. 1), i.e., a widthwise direction parallel to the upper surface 11e and perpendicular to the first and the second directions A and B. Likewise, the second side surfaces 11m are faced to each other in the third direction C. The third side surfaces 11n are faced to each other in the third direction C.

The first side surfaces 11k are located on opposite sides of the fiber confronting surface 11f in the third direction C. The second side surfaces 11m are located on opposite sides of a junction between the fiber confronting surface 11f and the clamp holding portion 11d to bridge over the fiber confronting surface 11f and the clamp holding portion 11d. The third side surfaces 11n are located on opposite sides of the clamp holding portion 11d in the third direction C.

A distance between the second side surfaces 11m in the third direction C is greater than a distance between the first side surfaces 11k in the third direction C. A distance between the third side surfaces 11n in the third direction C is greater than a distance between the second side surfaces 11m in the third direction C.

The aligning portion 11c has an upper surface 11p flush with the upper surface 11e of the main body portion 11a. At junctions of the first and the second side surfaces 11k and 11m, a pair of protruding portions 13 protruding in the third direction C are formed. Each of the protruding portions 13 has a thickness substantially equal to a thickness of the main body portion 11a.

The second side surfaces 11m are provided with a pair of pin-like engaging portions 15 protruding in the third direction C. At junctions between the second and the third side surfaces 11m and 11n, a pair of housing fitting portions 17 protruding in the third direction C and above the upper surface 11e of the main body portion 11a are formed. The housing fitting portions 17 are used to attach the first housing 11 to a mounting object (not shown).

The second housing 21 has a top plate portion 21a, a bottom plate portion 21b parallel to the top plate portion 21a with a space left therebetween, and a pair of side plate portions 21c disposed on opposite sides of the upper and the bottom plate portions 21a and 21b in the third direction C and connecting the upper and the bottom plate portions 21a and 21b to each other.

The top plate portion 21a is provided with a large cutout portion 21d formed from a rear end towards a front end in the first direction A (in other words, from a front end towards a rear end in the second direction B). Each of the side plate portions 21c is provided with a recessed portion 21e as a cutout formed from a rear end towards a front end in the first direction A.

The recessed portion 21e has a shape and a size generally coincident with those of the protruding portion 13 of the first housing 11 so that the protruding portion 13 is fitted to the recessed portion 21e.

The bottom plate portion 21b of the second housing 21 is provided with an elongated opening 21g formed at its center and extending in the first and the second directions A and B. The second housing 21 covers the upper surface 11e of the main body portion 11a, the aligning portion 11c, and the protruding portions 13.

Each of the top plate portion 21a, the bottom plate portion 21b, and the side plate portions 21c has a thin plate-like shape. Therefore, the second housing 21 itself is elastically deformable.

The clamp member 31 has a generally columnar shape of a rectangular section. In this embodiment, four clamp members 31 are arranged in parallel to one another. Each of the clamp members 31 holds a plurality of the optical fibers 61. The optical fibers 61 extend from front end faces of the clamp members 31 in the first direction A to the outside of the first housing 11.

The cover member 41 has a flat portion 41a and a pair of cover fitting portions 41b bent from a pair of opposite sides of the flat portion 41a in a direction perpendicular to the flat plate portion 41a and faced to each other. Each of the cover fitting portions 41b is inserted between the protruding portion 13 and the housing fitting portion 17 to face the second side surface 11m.

Each of the cover fitting portions 41b is provided with a slit 41c formed from its lower end towards the flat plate portion 41a. The slit 41c has an engaged portion 41e formed at an intermediate position in a vertical direction to receive the engaging portion 15.

The cover member 41 is engaged with and held by the first housing 11 when the engaging portions 15 having a pin-like shape and formed on the second side surfaces 11m are press-fitted into the slits 41c. At this time, the engaging portions 15 are press-fitted to reach the engaged portions 41c of the slits 41c.

The fiber protector member 51 serves to protect the end portions 61a of the optical fibers 61. The fiber protector member 51 is attached to a front opening portion 21h of the second housing 21 on the front side in the first direction A.

After the cover member 41 is attached to the first housing 11, the second housing 21 is fitted to the first housing 11 so as to cover an outer periphery of the first housing 11 on the front side in the first direction A. The second housing 21 is provided with a cylindrical cover portion 23 formed on the front side in the first direction A. The cover portion 23 is formed by the top plate portion 21a, a part of the bottom plate portion 21b, and parts of the side plate portions 21c. The cover portion 23 covers the end portions 61a of the optical fibers 61 protruding from the aligning portion 11c.

Each of the first housing 11, the second housing 21, the clamp members 31, the cover member 41, and the fiber protector member 51 is desirably produced by molding a resin material. However, some of these components may be produced using a metal material.

Now, assembling of the optical connector will be described. As illustrated in FIG. 2, it is assumed that each of the optical fibers 61 protrudes from the aligning portion 11c in the first direction A by a predetermined length L in a cantilevered state.

At first, the optical fibers 61 are held by the clamp members 31. The clamp members 31 holding the optical fibers 61 are fixedly attached to the clamp holding portion 11d of the first housing 11. For example, the clamp members 31 are fixedly attached to the clamp holding portion 11d by adhesion using an adhesive agent.

The end portions 61a of the optical fibers 61 protruding through the fiber inserting portion 11j are protruded in the first direction A. At this time, a protruding length of the end portion 61a of each of the optical fibers 61 protruding from the aligning portion 11c in the first direction A in a cantilevered state is not equal to the predetermined length L.

Each of the optical fibers 61 is adapted to be connected to a mating optical fiber of a mating optical connector (not shown). Prior to connection with the mating optical fiber of the mating optical connector, the optical fiber 61 is subjected to a polishing operation which will presently be described.

Figure 3:
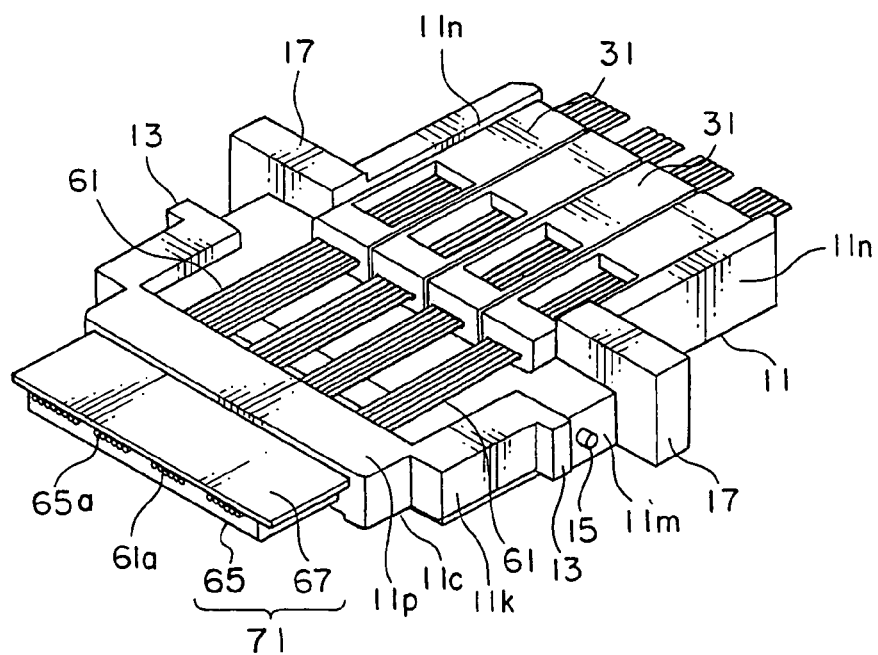
FIG. 3 is a perspective view showing the assembly of FIG. 2 together with optical fibers and a jig attached to end portions of the optical fibers.
Figure 4:
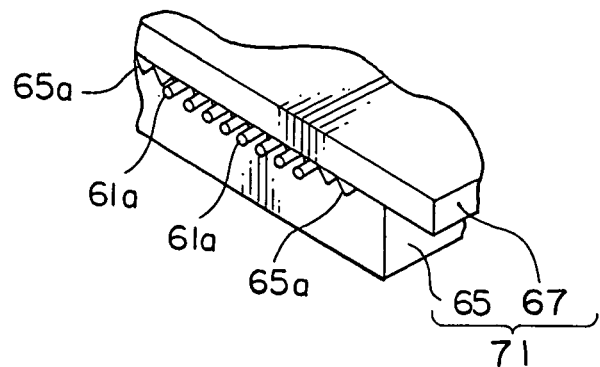
FIG. 4 is an enlarged perspective view of the jig and the optical fibers.

As illustrated in FIGS. 3 and 4, the end portions 61a of the optical fibers 61 are held by a jig 71 comprising a receiving plate 65 having a plurality of V-shaped grooves 65a and a holding plate 67 of a flat shape. Thereafter, the end portions 61a of the optical fibers 61 are slightly protruded in the first direction A from a front end face of the jig 71 on the front side in the first direction A. Then, the end portions 61a of the optical fibers 61 are polished by a polishing apparatus into the predetermined length L.

Thus, after the clamp members 31 holding the optical fibers 61 are mounted to the first housing 11, the optical fibers 61 can collectively be polished. Therefore, the end portions 61a of the optical fibers 61 can be uniformly adjusted to a common protruding length equal to the predetermined length L. In this event, the polishing operation can be carried out in the state where the clamp members 31 are mounted to the first housing 11.

Figure 5:
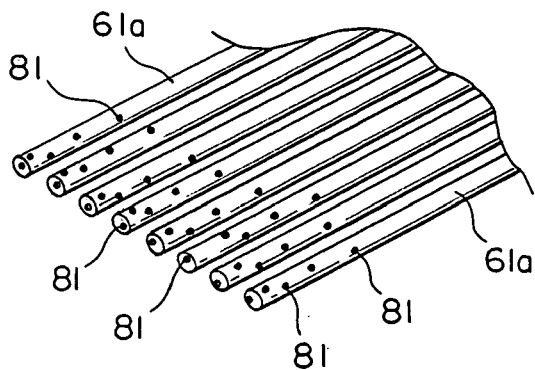
FIG. 5 is a perspective view of the optical fibers with polishing waste attached thereto.
Figure 6:
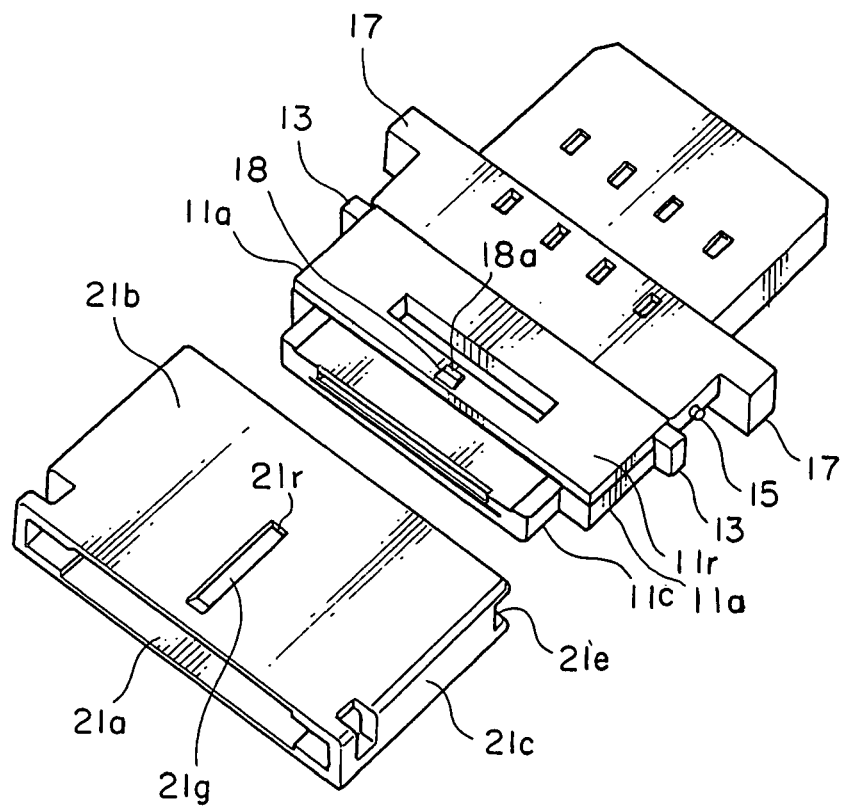
FIG. 6 is a perspective view of first and second housings illustrated in FIG. 1 as seen from a bottom surface.
Figure 7:
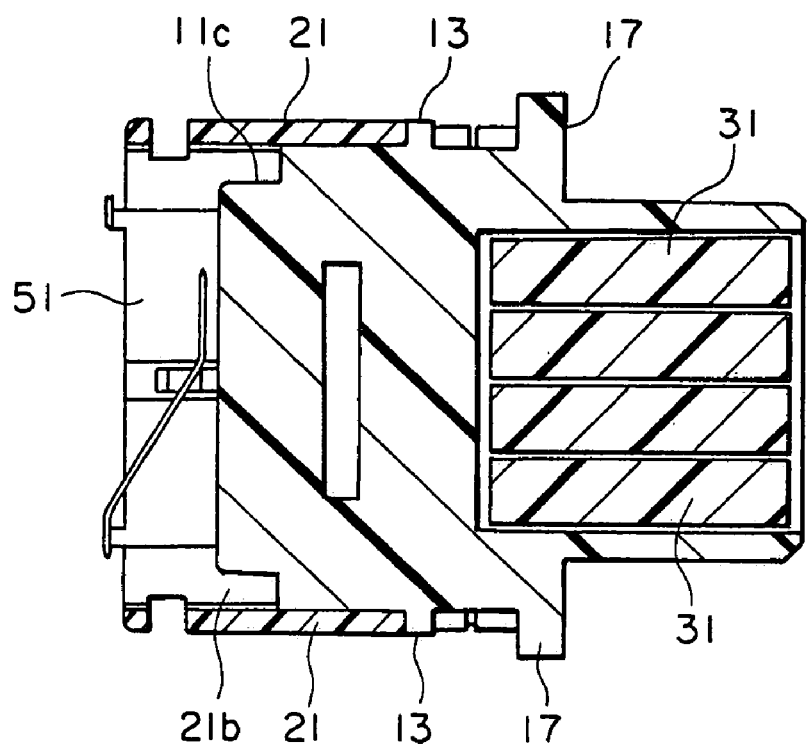
FIG. 7 is a horizontal sectional bottom view of the optical connector.
Figure 8:
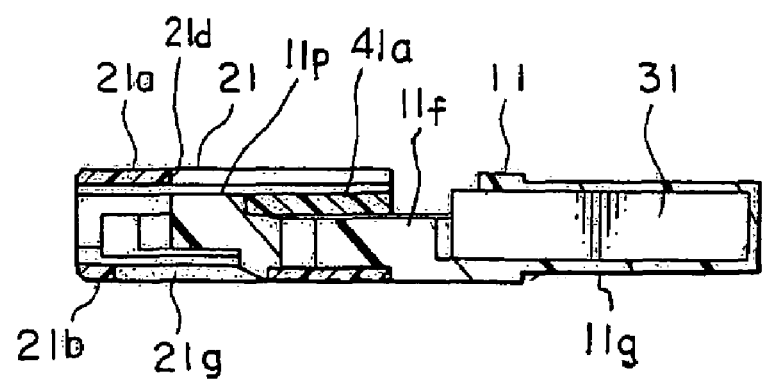
FIG. 8 is a vertical sectional view of main parts of the optical connector.

After polishing the end portions 61a of the optical fibers 61, polishing waste 81 or dust may be adhered to end faces or outer peripheral surfaces of the end portions 61a of the optical fibers 61 as shown in FIG. 5. In particular, after the optical fibers 61 are polished, the polishing waste 81 in a powdery state may be adhered to the end faces or the outer peripheral surfaces of the end portions 61a of the optical fibers 61. However, the end portions 61a of the optical fibers 61 can directly be touched if the jig 71 is removed. Therefore, the polishing waste 81 can be washed away and removed. Preferably, the polishing waste 81 or the dust adhered to the end portions 61a of the optical fibers 61 are washed away and removed by the use of a cleaning cloth impregnated with alcohol.

After the end portions 61a of the optical fibers 61 are polished and cleaned, the second housing 21 separate from the first housing 11 is fitted to the first housing 11. In this event, the first and the second housings 11 and 21 are locked with each other by a locking structure so as not to be released from each other.

Figure 9:
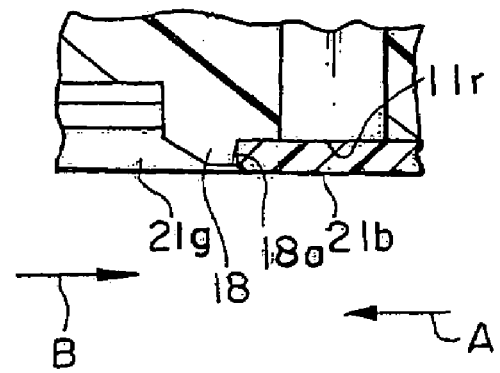
FIG. 9 is an enlarged sectional view of a recessed portion of the second housing illustrated in FIG. 8.

Referring to FIGS. 6 through 9, the locking structure of the first and the second housings 11 and 12 will be described. The first housing 11 has a bottom surface 11r provided with a locking portion 18 as a small protrusion. As shown in FIG. 9 in an enlarged scale, the locking portion 18 is provided with an inclined surface 18a in a direction intersecting the first and the second directions A and B. As is obvious from FIG. 9, the inclined surface 18a is inclined in the first direction A (i.e., leftward in the figure) away from the bottom surface 11r. The locking portion 18 is formed at a general center of the main body portion 11a in the vicinity of the aligning portion 11c in correspondence to the opening portion 21g of the bottom plate portion 21b of the second housing 21.

The second housing 21 is fitted to the first housing 11 from the front side in the first direction A. In this event, since the first housing 11 has the locking portion 18, the bottom plate portion 21b of the second housing 21 is pressed upward by the locking portion 18 to be elastically slightly deformed because the bottom plate portion 21b has a thin flat shape. When the second housing 21 is pushed towards the first housing 11 in the second direction B, inner surfaces of the recessed portions 21e of the second housing 21 are brought into press contact with the protruding portions 13 of the first housing 11.

At this time, the locking portion 18 enters into the opening portion 21g of the second housing 21 to be received therein. The bottom plate portion 21b of the second housing 21 is recovered from elastic deformation to be locked.

In the state where the recessed portions 21e of the second housing 21 are engaged with the protruding portions 13 of the first housing 11, the locking portion 18 may not be stably brought into contact with a contacting surface 21r of the opening portion 21g if the inclined surface 18a is not formed. This may result in occurrence of play between the first and the second housings 11 and 12.

In view of the above, the locking portion 18 of the first housing 11 is provided with the inclined surface 18a to be brought into contact with the contacting surface 21r of the opening portion 21g. The inclined surface 18a serves to absorb the play and assures stable contact even if there is some dimensional error in these components.

Generally speaking, in case where the end portions 61a of the optical fibers 61 are protruded frontward from the second housing 21 with the structure comprising the first and the second housings 11 and 21 as separate components, an accumulated dimensional error is increased because a greater number of components are used. In this invention, however, occurrence of play between the first and the second housings 11 and 21 can be avoided by forming the inclined surface 18a. Therefore, it is possible to protrude the end portions 61a of the optical fibers 61 with high accuracy.

Finally, the fiber protector member 51 is inserted into the second housing 21 in the second direction B from the front side of the second housing 21. The cover member 41 is attached to the first housing 11. Thus, the assembling is completed.

In this embodiment, since the protruding length of the optical fiber 61 protruding from the first housing 11 can be increased, it is possible to improve the degree of freedom in fitting the jig 71 upon polishing the optical fiber 61. Since the optical fibers 61 can be polished in the state where the clamp members 31 are attached to the first housing 11, It is therefore possible to suppress the variation in protruding length of the optical fibers 61. Furthermore, it is possible to easily clean the end face or the outer peripheral surface of the optical fiber 61 after the optical fiber 61 is polished. By providing the locking portion 18 with the inclined surface 18a, the first and the second housings 11 and 21 can stably be fitted to each other without leaving any play.

While this invention has thus far been described in conjunction with the preferred embodiments thereof, it will be readily possible for those skilled in the art to put this invention into practice in various other manners.

What is claimed is:

1. An optical connector to be connected to a plurality of optical fibers having axial end portions, comprising:
   a clamp member for holding said optical fibers;
   a first housing coupled to said clamp member, said first housing including an aligning portion for aligning said optical fibers in the vicinity of said axial end portions and a clamp holding portion holding said clamp member, said axial end portions of the optical fibers protruding outward from said aligning portion to have cantilevered protruded portions;
   a cover member combined with said first housing and cooperating with said first housing to cover portions of said optical fibers aligned by said aligning portion;

a second housing coupled to the combined first housing and cover member even when said optical connector is not connected to a mating connector, said second housing having a cylindrical cover portion collectively surrounding said aligning portions; and a fiber protector member inserted in said cylindrical cover portion to protect the axial end portions of said optical fibers;

said cylindrical cover portion having a top plate portion, a bottom plate portion parallel to said top plate portion, with a space left therebetween, and a pair of side plate portions disposed on opposite sides of said top and said bottom plate portions and connecting said top and said bottom plate portions to each other; and said cylindrical cover portion covering said axial end portions protruding from said aligning portion.

2. The optical connector according to claim 1, wherein said first housing has a locking portion formed on a bottom surface of said first housing, said second housing has a bottom plate portion elastically deformable and facing said bottom surface of the first housing when said second housing is fitted to said first housing, said bottom plate portion having an opening portion engaged with said locking portion.

3. An optical connector according to claim 2, wherein said locking portion has an inclined surface formed at a position where said locking portion is brought into contact with a contacting portion of said opening portion.

4. An optical connector according to claim 1, wherein said first housing has an engaging portion formed on a side surface thereof, said cover member being provided with a slit to receive said engaging portion press-fitted thereto, thereby holding said cover member on said first housing.

* * * * *